(No Model.)  2 Sheets—Sheet 1.
W. MASON.
DETACHABLY UNITING GUN BARRELS WITH STOCKS.
No. 565,766.  Patented Aug. 11, 1896.
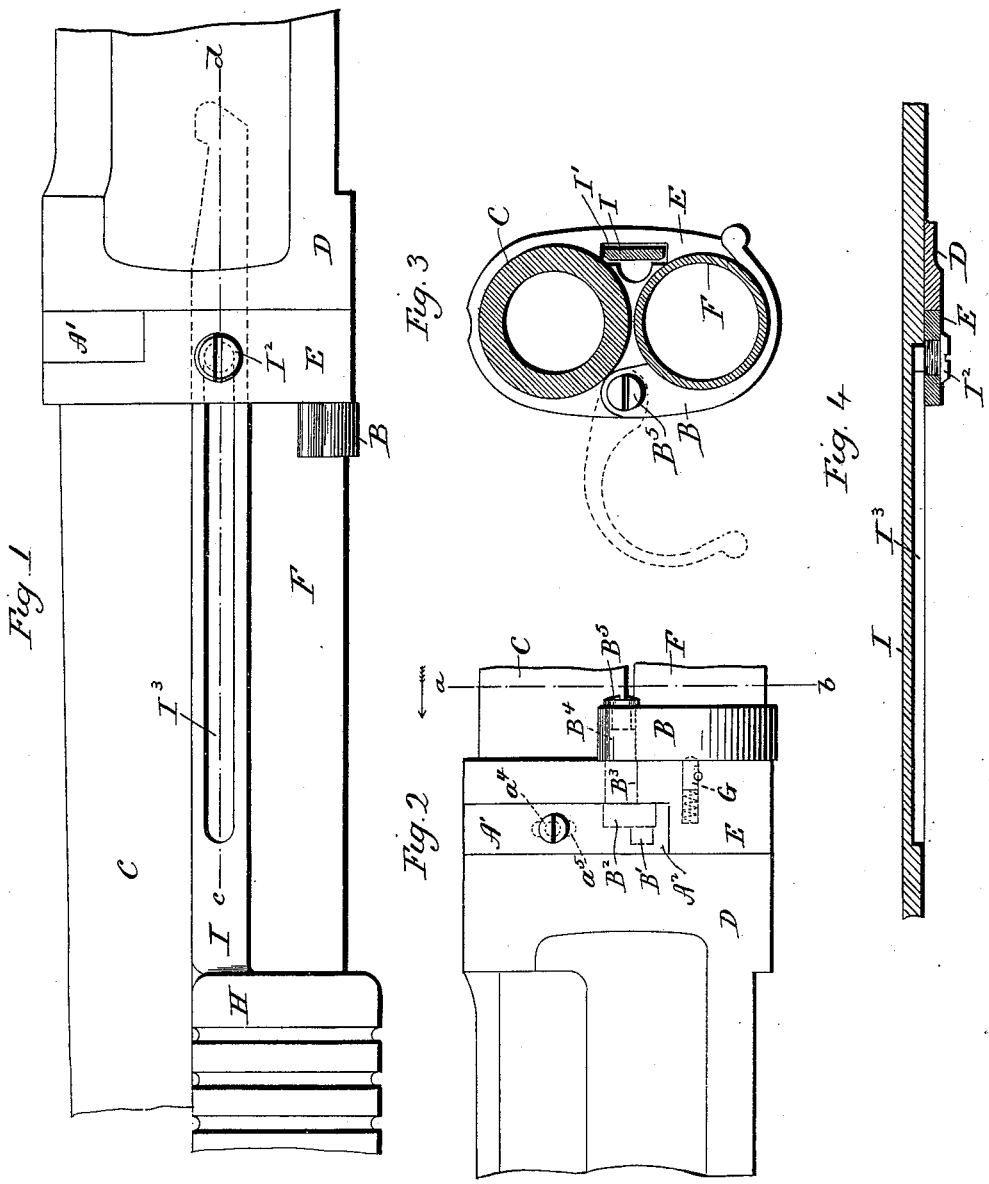

(No Model.) 2 Sheets—Sheet 2.
W. MASON.
DETACHABLY UNITING GUN BARRELS WITH STOCKS.
No. 565,766. Patented Aug. 11, 1896.
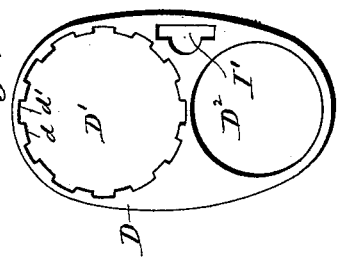
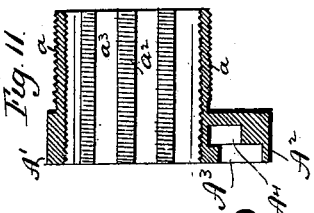
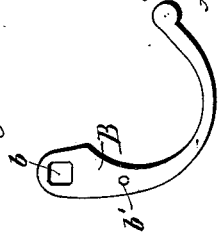
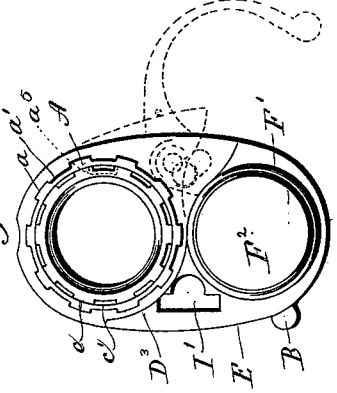
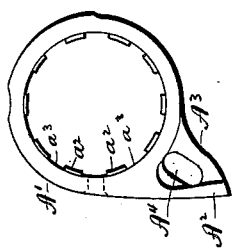
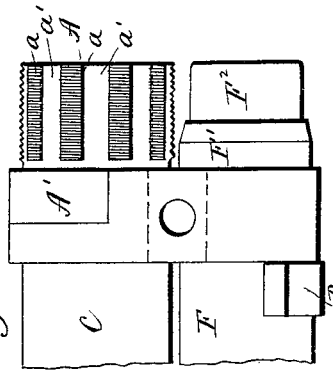
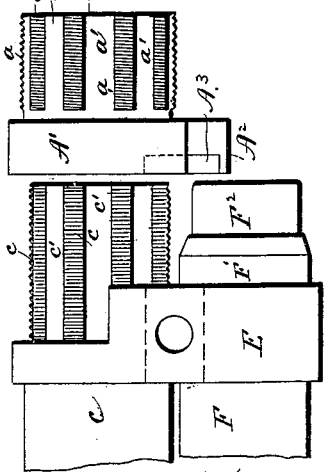

UNITED STATES PATENT OFFICE.

WILLIAM MASON, OF NEW HAVEN, CONNECTICUT, ASSIGNOR TO THE WINCHESTER REPEATING ARMS COMPANY, OF SAME PLACE.

DETACHABLY UNITING GUN-BARRELS WITH STOCKS.

SPECIFICATION forming part of Letters Patent No. 565,766, dated August 11, 1896.

Application filed December 8, 1894. Serial No. 531,216. (No model.)

*To all whom it may concern:*

Be it known that I, WILLIAM MASON, of New Haven, in the county of New Haven and State of Connecticut, have invented a new Improvement in Magazine-Firearms; and I do hereby declare the following, when taken in connection with the accompanying drawings, and the letters of reference marked thereon, to be a full, clear, and exact description of the same, and which said drawings constitute part of this specification, and represent, in—

Figure 1, a broken view in side elevation of one form of a gun constructed in accordance with my invention; Fig. 2, a similar but less comprehensive view of the opposite side of the gun; Fig. 3, a view in vertical cross-section on the line $a$ $b$ of Fig. 2 through the barrel and magazine of the gun, and looking toward the frame thereof; Fig. 4, a view in horizontal longitudinal section on the line $c$ $d$ of Fig. 1, and showing how the retaining-screw in the yoke limits the forward movement of the operating-bar, which is connected with the hand-piece sliding on the magazine; Fig. 5, a detached broken view in side elevation, showing the butt-end of the gun-barrel, the rear end of the magazine, the yoke which connects the said parts, and the oscillatory coupling-sleeve, which is mounted on the butt-end of the gun-barrel; Fig. 6, an end view of the parts shown in Fig. 5, looking into the gun-barrel and against the follower in the magazine, and showing by broken lines the operating-lever in its open position; Fig. 7, a view in end elevation looking into the frame; Fig. 8, a detached broken view in side elevation, showing the butt-end of the gun-barrel and the rear end of the magazine, the oscillatory sleeve having been removed from the barrel; Fig. 9, a detached view in side elevation of the oscillatory coupling-sleeve; Fig. 10, a detached view of the forward end thereof; Fig. 11, a view thereof in vertical longitudinal section; Fig. 12, a detached view in side elevation of the operating-lever; Fig. 13, a detached view in side elevation of the shaft which connects the said lever with the oscillatory sleeve; Fig. 14, an end view of the shaft.

My invention relates to an improvement in magazine-firearms of that class in which the barrel and magazine are detachably connected with the frame for convenience in carrying and cleaning the arm, the object being to produce a compact and effective arm composed of few parts and constructed with particular reference to convenience in connecting the barrel and magazine with the frame and disconnecting them therefrom, and to a solid union of the said parts when the arm is assembled for use.

With these ends in view, my invention consists in the combination, with the barrel and frame of the gun, of an oscillatory coupling-sleeve for connecting the said parts, and an independently-formed pivotal operating-lever connected with the said sleeve for oscillating the same.

My invention further consists in certain details of construction and combinations of parts, as will be hereinafter described, and pointed out in the claims.

In carrying out my invention, as herein shown, I employ an oscillatory coupling-sleeve A and an independently-formed operating-lever B, adapted to be manipulated by the sportsman, and connected with the sleeve so that when it is thrown into its open position it will oscillate the sleeve for disconnecting the gun-barrel C from the frame D and when thrown into its closed position rotate the sleeve oppositely for solidly coupling the barrel with the frame. The sleeve A is provided at its inner or forward end with a band or flange A', having an offsetting lug $A^2$, constructed with a clearance recess $A^3$, the bottom wall of which contains slot $A^4$, which receives an eccentric or crank-pin B', located at the outer end of a crank-arm $B^2$, formed upon the inner end of a short rock-shaft $B^3$, mounted, as shown, in the yoke E, which couples the inner ends of the gun-barrel C and the magazine F together, the outer end of the shaft being squared, as at $B^4$, to receive the operating-lever B, the inner end of which has a square opening $b$ to adapt it to fit over the said squared end of the shaft, upon which the lever is retained by means of a screw $B^5$, the shank of which enters the said squared end $B^4$ of the shaft, which is thereto counterbored and threaded, as at $B^6$, as seen in Fig.

13. If desired, the said operating-lever may be mounted in the lug $A^2$, and therefore virtually in the coupling-sleeve, and have a point of purchase upon the yoke. It is not necessary, therefore, that the lever be mounted independently of the sleeve, as herein shown, though that is the approved construction. By providing for the connection of the sleeve A and operating-lever B as described the sleeve is positively operated in either direction by means of the lever. I do not limit myself, however, to connecting the sleeve and lever as set forth, as my invention comprehends any construction of sleeve and independently-formed lever whereby the latter may be utilized to oscillate the former.

By employing an independently-formed lever for operating the sleeve I virtually secure a compound leverage for the same, the offsetting lug $A^2$ forming one lever and the lever B the other. The said lever B is easy to operate by the fingers, but acts with much more power than a lever or handle forming an extension of the sleeve and rigid therewith, as in my prior patent No. 499,464, sealed June 13, 1893, on account of the fact that the leverage is compounded, as mentioned. The exterior surface of the sleeve is constructed with a left-hand screw-thread $a$, which is broken into short sections and interrupted by broad shallow grooves $a'$, practically corresponding in width to the length of the interrupted threads which take into an interior left-hand screw-thread $d$ interrupted by broad shallow grooves $d'$, and formed upon the inner wall of the cylindrical opening $D'$ made in the upper portion of the forward end of the frame D, for the reception of the inner or butt end of the gun-barrel C, as seen in Fig. 7, which also shows the opening $D^2$ formed in the lower portion of the forward end of the frame to receive the beveled inner end $F'$ of the magazine, and the follower $F^2$ mounted therein.

It will be understood, of course, that the exterior thread $a$ of the sleeve corresponds in pitch and in its interruptions to the interior thread $d$ of the frame, between which and the gun-barrel the sleeve is located, so as to form an intermediate coupling part or member. As herein shown the exterior thread of the sleeve and the interior thread of the frame are both made of fine pitch, and interrupted so as to be broken into sections of very short threads. This construction is advantageous because it provides for the connection of the barrel with the frame and the disconnection of the barrel therefrom by a very limited movement of the sleeve, which is obviously more easily secured than an extended movement thereof; but the pitch of the said threads and the manner of interrupting them may be varied, as desired, without departing from my invention.

By providing the exterior surface of the sleeve with the left-hand screw-thread $a$ and the opening $D'$ in the frame with a left-hand screw-thread $d$ the turning of the sleeve into its closed position effects the drawing of the sleeve, and hence the barrel, into the said opening for a distance proportional to the pitch of the threads, the forward end of the frame being seated solidly against the rear face of the yoke E and the rear edge of the band or flange $A'$ of the sleeve, so as to form a tight closed joint between them.

The interior of the sleeve, and also of the band $A'$ thereof, is constructed, as herein shown, with an interior right-hand thread $a^2$, interrupted by numerous broad shallow grooves $a^3$, the said thread and grooves extending throughout the length of the inner surface of the sleeve and band, as plainly shown in Fig. 11, for it will be understood that the opening through the band is coincident with the internal diameter of the sleeve. The band might be regarded as forming a part of the sleeve itself and as a flange formed upon the outer face of the forward end thereof. The exterior surface of the butt-end of the gun-barrel is constructed with an exterior right-hand thread $c$, interrupted by broad shallow grooves $c'$, the thread $c$ corresponding to the interior thread $a^2$ of the sleeve and the grooves $c'$ corresponding to the grooves $a^3$ thereof. It will be understood from this description that the interior interrupted thread of the sleeve coacts with the exterior interrupted thread of the barrel to connect the sleeve and barrel and permit the sleeve to be oscillated thereupon, and also to have a slight endwise movement back and forth thereupon. A screw $a^4$, located in the band $A'$ of the sleeve, extends into a shallow groove $a^5$, formed in the side of the butt-end of the barrel, and holds the sleeve in position thereupon without interfering with its oscillatory or limited endwise movement, for which purpose the said groove may be made a trifle wider than the inner end of the said screw.

By providing the interior surface of the sleeve with a right-hand thread $a^2$ and the exterior surface of the butt-end of the barrel with a right-hand thread $c$ the coupling-sleeve A is moved endwise, or back and forth, on the barrel within very narrow limits, as described, and so that when the operating-lever B is moved from its open to its closed position the sleeve will operate to draw the barrel inward for a distance represented by the pitch of the said threads, and so as to close the joint between the forward edge of the band or flange $A'$ of the sleeve and the bottom wall of the recess $D^3$ formed in the rear face of the yoke E. It will thus be seen that by making two of the coacting interrupted threads left-hand threads and the other two coacting interrupted threads right-hand threads a double drawing action for solidly securing the barrel in the frame is attained, for the threads on the sleeve and frame not only draw the parts together, but also the threads on the sleeve and barrel operate to the same end.

I may say here that the two pairs of coacting interrupted threads might be reversed in pitch if the lever were located on the left-hand side of the gun, as it might be in some constructions. I might also say that lugs inclined so as to draw against each other might replace the threads, though I prefer sectional or interrupted threads to lugs. I may also say that I employ an interrupted thread upon the inner surface of the sleeve and upon the exterior surface of the butt-end of the barrel on account of the convenience it affords in the initial assemblance of the sleeve with the barrel, and not on account of necessity, for a continuous thread upon the interior surface of the sleeve would properly coöperate with a continuous thread upon the barrel for connecting the two parts, which, however, if constructed with continuous threads, would not be so easy to assemble. I conceive, also, that the screw $a^4$, just spoken of, might be replaced by some other means of connecting the sleeve with the barrel, with capacity for limited oscillatory and endwise movement thereupon.

The band A' and its offsetting lug $A^2$ are located in a recess $D^3$ of corresponding shape, formed to receive them in the rear face of the yoke E, as seen in Fig. 6, so that when the sleeve is in its normal or closed position the exterior surface of the band or flange A' is flush with the exterior surface of the yoke, as seen in the same figure, which also shows by broken lines that only a slight movement of the band and sleeve takes place when the operating-lever is thrown into its open position.

It will be understood that the sleeve is slipped over the butt-end of the barrel and secured thereto, with a capacity of rotation and slight endwise movement thereupon, in the initial assemblance of the gun, and that thereafter it is not removed, except for cleaning or repairing the same. For coupling the barrel and magazine the operating-lever is manipulated by the fingers and thrown into its open position, whereby the sleeve is positively rotated, so that when the gun-barrel C and magazine F are brought into alinement with the openings D' and $D^2$ in the frame the interrupted exterior thread $a$ of the sleeve will be brought into alinement with the grooves $d'$, interrupting the interior thread $d$ of the frame, the said interrupted thread $d$ of which will, on the other hand, be brought into alinement with the grooves $a'$, interrupting the exterior thread $a$ of the sleeve. The interrupted threads of both parts therefore clear each other, so as to permit the butt-end of the gun-barrel and its encircling sleeve to slide directly into the opening D' of the frame, the opening $D^2$ of which will simultaneously receive the beveled rear end F' of the magazine. The parts having been brought into position for coupling, the lever B is now drawn into its closed position, whereby it will act, through the medium of the pin B' of the shaft $B^3$ and the slot $A^4$ in the lug $A^2$ offsetting from the band A' of the sleeve, to rotate the sleeve positively through a short distance, so as to mesh the interrupted threads $a$ and $d$ into each other, whereby the gun-barrel will be drawn inward into and solidly coupled with the frame. The operating-lever B is retained in its closed position either by being snapped, so to speak, under the gun-barrel or by means of some special retaining device. As herein shown, I have provided a spring-pressed friction-pin G, which is mounted in the yoke E, as seen in Fig. 4, and enters a very shallow recess $b'$ formed in the inner face of the lever, as seen in Figs. 6 and 12, but any other means than that shown might be employed for holding the lever in its closed position. For disconnecting the barrel and magazine from the frame the lever is simply thrown into its open position, whereby the sleeve is positively rotated, so that its interrupted exterior thread $a$ will be cleared from the interrupted interior thread $d$ of the frame, after which the butt-end of the gun-barrel and the sleeve may be readily drawn out of the frame, bringing the magazine with it.

As herein shown, though not necessarily, my improved coupling-sleeve and independent operating-lever have been employed in a gun of that class in which a sliding supporting-handle H, mounted on the magazine so as to slide back and forth thereupon, is employed to operate the feeding mechanism and breech-block, which are not shown, the hand-piece being thereto provided with an action-bar I, the rear end of which is adapted to be connected with the feeding mechanism and breech-block in any suitable manner which permits the said rear end to be withdrawn therefrom when it is desired to separate the barrel and magazine from the frame. As herein shown, the said bar passes rearward through a suitable opening I', formed in the yoke E, which latter is furnished with a retaining-screw $I^2$, the shank of which enters a long shallow recess $I^3$, formed in the exterior surface of the bar, and limiting by its end walls the longitudinal movement thereof. It will be clear that when the barrel and magazine are detached from the frame and the rear end of the bar is therefore disconnected from the feeding mechanism and breech-block of the arm the rear end of the bar would pass through the slot I' and leave the sliding supporting-handle free to "shuck" back and forth on the magazine were it not for the retaining-screw $I^2$, which by its engagement with the rear end wall of the slot $I^3$ limits the forward movement of the sliding supporting-handle and bar. I may call attention to the fact that when my improved sleeve is used in connection with a gun having such a sliding supporting-handle and bar the latter assists in maintaining the registration of the exterior thread and grooves of the sleeve with the interior thread and grooves of the frame while the butt-end of the barrel and the rear end of the magazine are being slid into the openings D' and D² in the frame, as before described, whereby injury to the interrupted threads last spoken of is avoided. It will be observed by reference to Fig. 7 that the rear end of the bar has to pass not only through an opening I', formed in the yoke E, but also through a corresponding opening I⁴ formed in the frame. I would have it clearly understood, however, that my improved retaining-sleeve and independently formed and operated operating-lever are not limited to use with a gun employing a sliding supporting-handle and slide to operate the feeding mechanism of the gun, and vice versa. I do not, however, in this application make any claim to a slotted action-bar when combined with a retaining-screw mounted in the yoke of the arm, as I have made that combination the subject of another application, filed October 5, 1895, Serial No. 564,713.

In view of the suggestions herein contained regarding changes, and of other changes which may obviously be made, I would have it understood that I do not limit myself to the exact changes herein shown and set forth, but hold myself at liberty to make such variations as fall within the spirit and scope of my invention.

Having fully described my invention, what I claim as new, and desire to secure by Letters Patent, is—

1. In a magazine-gun, the combination with the frame and barrel thereof, of an oscillatory coupling-sleeve for connecting the same, an operating-lever formed independent thereof, and a positive connection between the inner end of the lever and the sleeve for applying the power of the lever to the oscillation of the sleeve in either direction, substantially as described.

2. In a magazine-gun, the combination with the frame and barrel thereof, of an oscillatory sleeve for coupling the same, an operating-lever, and means for connecting the lever and sleeve for applying the power of the lever to the oscillation of the sleeve, the said means including a crank-pin connected with the lever and a slot having fixed relation to the sleeve, substantially as described.

3. In a magazine-gun, the combination with the frame and barrel thereof, of an oscillatory sleeve for coupling the same, provided at its forward end with an offsetting band containing a slot; an operating-lever, and means for connecting the lever and sleeve for applying the power of the former to the oscillation of the latter, the said means including a short shaft to which the lever is applied, and a crank-pin which enters the slot, substantially as described.

4. In a magazine-gun, the combination with a frame having the cylindrical opening with which it is provided to receive the butt-end of the barrel, constructed with an interrupted interior thread; of a barrel having its butt-end constructed with an interrupted exterior thread, an oscillatory coupling-sleeve constructed with an interrupted interior thread corresponding to the interrupted exterior thread formed upon the butt-end of the barrel upon which the said sleeve is mounted with capacity for oscillatory movement, and the exterior surface of the said sleeve being constructed with an interrupted thread corresponding to the said interrupted interior thread of the frame; an operating-lever formed independent of the sleeve, and means for positively connecting the lever and sleeve for applying the power of the former to the oscillation of the latter, substantially as described.

5. In a magazine-gun, the combination with the frame thereof, of a barrel and magazine, a yoke connecting the butt-end of the barrel and the rear end of the magazine, and having its rear face cut away or recessed, an oscillatory coupling-sleeve mounted upon the butt-end of the barrel with a capacity for limited oscillatory movement thereupon, and having formed at its forward end a band having an offsetting lug, the said band and lug fitting into the recess formed in the yoke; an operating-lever formed independently of the sleeve, and means interposed between the said lever and sleeve for utilizing the power of the former to oscillate the latter, substantially as described.

6. In a magazine-gun, the combination with the frame and barrel thereof, of an oscillatory sleeve for connecting the same, an operating-lever, and means located between the lever and sleeve for applying the power of the former to the oscillation of the latter, the said sleeve being provided upon its exterior surface with interrupted threads taking into interrupted threads of corresponding pitch formed in the frame, and the interior surface of the sleeve being constructed with oppositely-pitched interrupted threads taking into correspondingly-pitched interrupted threads formed upon the butt-end of the gun-barrel, substantially as described.

In testimony whereof I have signed this specification in the presence of two subscribing witnesses.

WILLIAM MASON.

Witnesses:
GEO. D. SEYMOUR,
FRED C. EARLE.